United States Patent [19]

Proudfit

[11] 3,932,107

[45] Jan. 13, 1976

[54] APPARATUS FOR FORMING COMPOSITE ARTICLES
[75] Inventor: James R. Proudfit, Youngwood, Pa.
[73] Assignee: The General Tire & Rubber Company, Akron, Ohio
[22] Filed: Jan. 9, 1975
[21] Appl. No.: 539,674

Related U.S. Application Data
[63] Continuation-in-part of Ser. No. 469,987, May 15, 1974, abandoned.

[52] U.S. Cl. .............. 425/509; 425/519; 425/127; 425/324 R; 425/116; 425/375
[51] Int. Cl.² ... B29C 5/00; B29F 5/00; B29C 17/00
[58] Field of Search ........... 425/501, 503, 506, 507, 425/508, 509, 515, 518, 519, 520, 127, 324 R, 375, 130, 468, 447, 112, 116

[56] References Cited
UNITED STATES PATENTS

| 1,157,420 | 10/1915 | Roberts | 425/519 X |
| 1,201,503 | 10/1916 | Roberts | 425/519 X |
| 1,590,768 | 6/1926 | Mahoney | 425/519 X |
| 2,288,356 | 6/1942 | Humphrey | 425/519 X |
| 2,364,029 | 11/1944 | Ryan | 425/116 X |
| 2,387,747 | 10/1945 | Cowley | 425/519 X |
| 2,537,089 | 1/1951 | Rempel | 425/116 |
| 3,151,196 | 9/1964 | Tipton | 425/447 X |
| 3,374,500 | 3/1968 | Drenning | 425/468 X |
| 3,478,387 | 11/1969 | Ruekberg | 425/130 X |
| 3,504,063 | 3/1970 | Lemelson | 425/375 X |
| 3,505,442 | 4/1970 | Culpepper | 425/507 X |

Primary Examiner—J. Howard Flint, Jr.
Attorney, Agent, or Firm—F. C. Rote, Jr.; James M. Peppers

[57] ABSTRACT

Apparatus for forming a composite article including an inflatable center adapted to retain a predetermined shape covered with a covering of molded material and preferably an inflatable composite article such as a game ball with a covering of more uniform thickness. Surfaces of complementary elements of a mold are adapted to define, when the mold is closed, a molding cavity corresponding to the outer surface of a desired composite article. Said surfaces are electrostatically sprayed with a molding material to form a layer of molding material over said surfaces. Preferably, electrostatic spraying is performed while heating the mold preferably to a temperature above 135°C. and most desirably between 150° and 190°C. An inflatable center is then inserted into the mold and the mold is closed to define the molding cavity with the inflatable center therein. Thereafter, the inflatable center is inflated preferably to a pressure greater than 600 kilopascals and most desirably between 1100 and 1250 kilopascals to compress the molding material against the surfaces of the molding cavity to produce mold details. The mold is then heated preferably to a temperature greater than 135°C. and most desirably to a temperature between 150° and 190°C. to fuse the molding material to the desired covering for the inflatable composite article. Subsequently, the mold is cooled and the composite article is removed from the mold.

22 Claims, 5 Drawing Figures

U.S. Patent   Jan. 13, 1976   Sheet 1 of 2   3,932,107
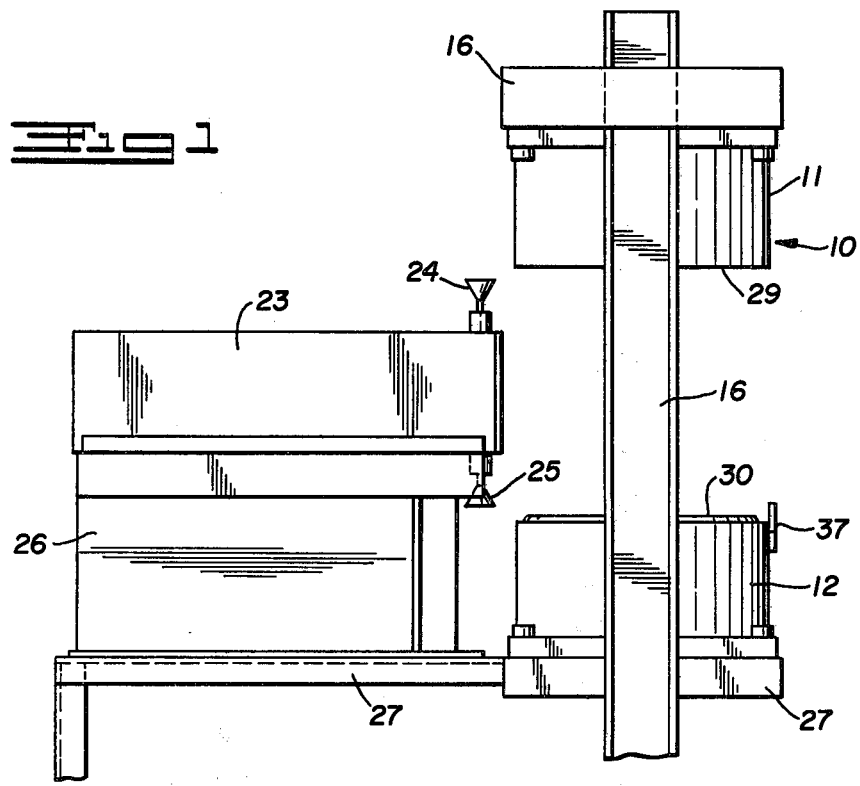
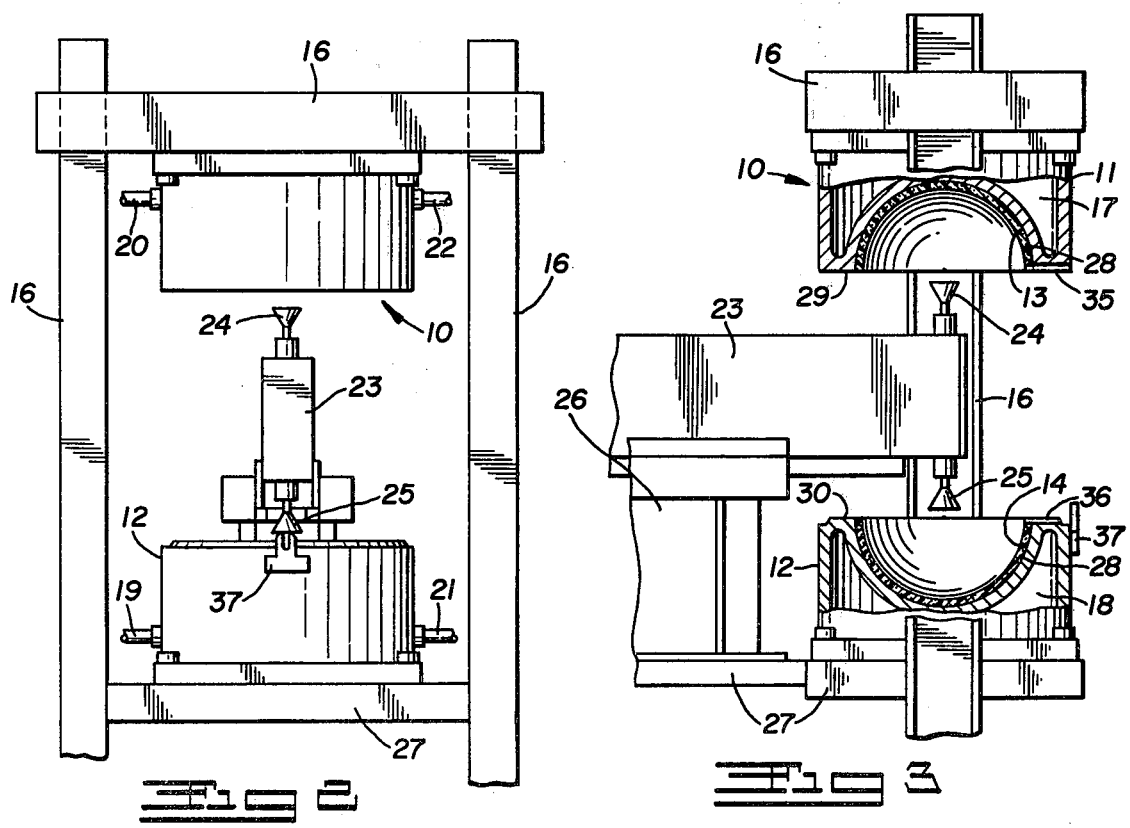

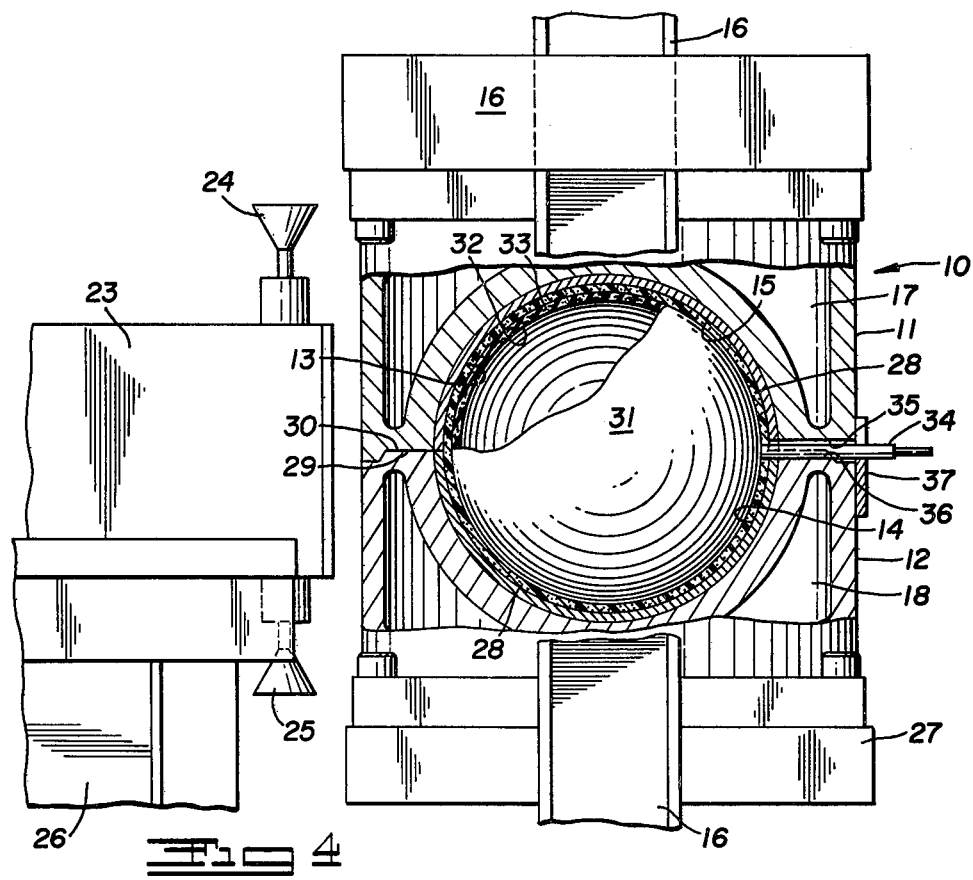
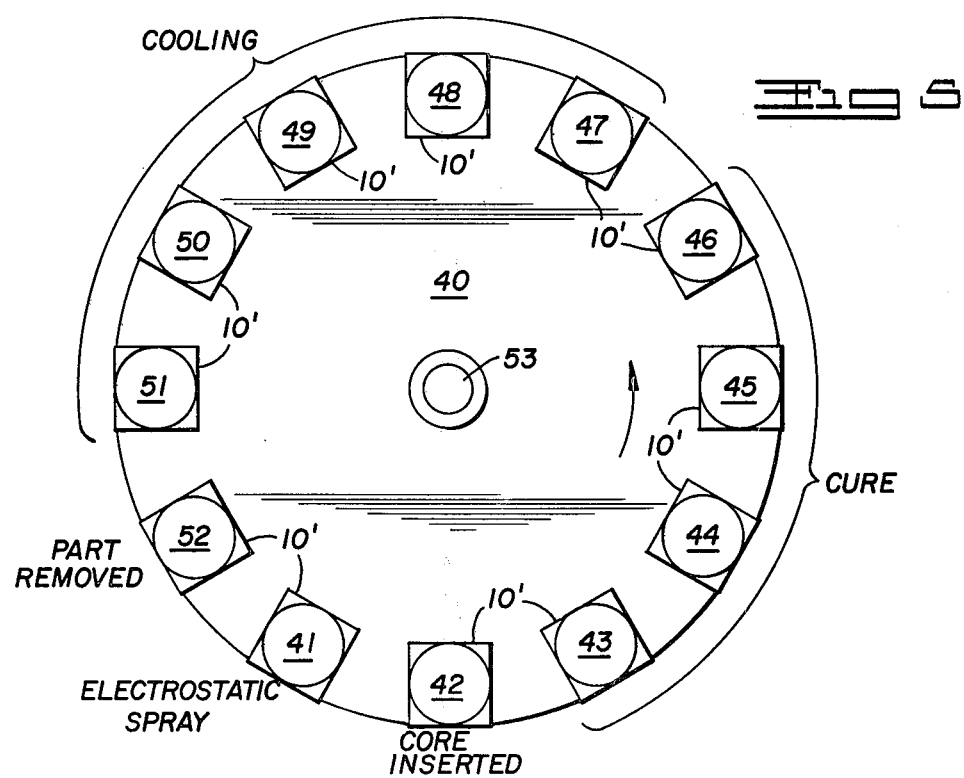

APPARATUS FOR FORMING COMPOSITE ARTICLES

This is a continuation-in-part of application Ser. No. 469,987, filed May 15, 1974, and now abandoned.

FIELD OF THE INVENTION

The present invention relates to apparatus for covering composite articles and particularly inflatable composite articles such as game balls with coverings of more uniform thickness.

BACKGROUND OF THE INVENTION

Inflatable game balls are balls such as volleyballs, basketballs, footballs and softballs, which are pressurized for use. Other inflatable composite articles are boat buoys, flotation gear and the like.

Inflatable game balls as well as other kinds of inflatable composite articles have been variously made and covered by rotocasting, plastisol flooding, plastisol dipping, vacuum forming and application of individual panels. The difficulties with such manufacturing techniques have been that they do not provide a covering of uniform thickness over the surface of the ball. It is essential to the quality of game balls as well as certain other inflatable composite articles that the covering be molded to a thickness as uniform as possible.

Electrostatic spraying and coating of molds with molding materials has been variously utilized in molding. The technique provides for uniform and selective application of molding material over the surfaces of the mold and in turn molded articles of uniform thickness. Exemplary of the art is believed to be U.S. Pats. No. 3,182,103, No. 3,374,500, No. 3,408,432, No. 3,478,387, No. 3,491,170, No. 3,504,063, No. 3,607,998 and No. 3,660,547. Such electrostatic techniques have not been adapted to provide for the covering of inflatable composite articles and particularly inflatable game balls with coverings of substantially uniform thickness.

Inflatable inner molds have been utilized in molding and forming plastic articles that have constricted openings, such as milk bottles and Christmas tree ornaments. Such inflatable molds provide for the making of such hollow bodies in one piece, rather than in two or more pieces followed by assembly. Illustrative of the disclosures utilizing inflatable molds are believed to be those set forth in U.S. Pats. No. 3,530,208 and No. 3,607,998. Such inflatable molds have not heretofore been adapted to provide composite articles and particularly inflatable composite articles with coverings of substantially uniform thickness. Other somewhat related disclosures are set forth in U.S. Pats. No. 2,614,955, No. 3,135,640 and No. 3,151,196.

SUMMARY OF THE INVENTION

An apparatus is provided for covering composite articles and particularly inflatable composite articles and specifically game balls with a covering of more uniform thickness than is generally provided with prior art molding techniques. First, a mold is formed of complementary elements having surfaces adapted to form, when the mold is closed, a molding cavity corresponding to outer surfaces of a desired composite article.

While open, the surfaces of the elements of the mold defining the mold cavity are electrostatically sprayed with a molding material to form a substantially uniform layer of molding material over said surfaces. The molding material may be deposited on the surfaces of the molding cavity in the form of fine droplets or particulate solid materials by spraying the molding material in a powder or liquid form. The liquid state may be produced with a carrier fluid such as steam or a solvent, or by heating the molding material to a molten or semi-molten state before spraying.

Preferably, the molding material is electrostatically sprayed onto said surfaces in a powder form while the mold is heated preferably to a temperature greater than 135°C. and most desirably between 150° and 190°C. The molding material is thereby partially fused during the spraying step. Accordingly, a thicker and more uniform covering can be produced because the insulating effects of the molding material can be reduced, and because a high electrical charge can be maintained between the mold and the spray nozzle more uniformly and for a longer length of time.

Suitable molding materials are powders or plastisols of thermoplastic resins such as polyvinylchloride, polyethylene, polypropylene, polyacetate and polystyrene. Typically, the molding material utilized for covering game balls is polyvinylchloride (PVC). Other molding materials contemplated for use are thermosetting resins such as epoxides, polyesters, phenolics, ureaformaldehyde polyamides and polyimides. Even certain powder glasses and other ceramics as well as certain powdered metals and carbon may be utilized in certain applications.

After spraying, an inflatable center is inserted into the mold, and the mold is closed to define the molding cavity with the inflatable center therein. Typically, the inflatable center is comprised of vulcanized rubber bladder covered with nylon twisted yarn or another textile fiber to retain the center in a predetermined shape when inflated. The center is then inflated preferably to a pressure greater than about 600 kilopascals and most desirably between 1100 and 1250 kilopascals to compress the molding material uniformly against the surface of the molding cavity to produce mold details.

Thereafter, the molding material is fused (or cured) by heating the mold preferably to a temperature greater than 135°C. and most desirably between 150° and 190°C. The mold is typically heated by passing steam through passageways in the elements of the mold. Thereafter, the mold is cooled typically by water quenching or refrigeration, the mold is opened, and the composite article removed from the mold.

Other details, objects and advantages of the invention will become apparent as the following description of the presently preferred embodiments for making and practicing the same proceeds.

DESCRIPTION OF THE DRAWINGS

In the accompanying drawings, the presently preferred embodiments for practicing the invention are illustrated, in which:

FIG. 1 is a side elevational view of a mold and electrostatic spray apparatus suitable for practicing the present invention;

FIG. 2 is an end elevational view of the mold and electrostatic spray apparatus shown in FIG. 1;

FIG. 3 is a side elevational view, with portions broken away, of the mold and electrostatic spray apparatus shown in FIG. 1, with the electrostatic spray apparatus positioned for electrostatically spraying a molding material into the mold cavity;

FIG. 4 is a fragmentary side elevational view, with portions broken away, of the mold and electrostatic spray apparatus shown in FIG. 1, with the electrostatic spray retracted and the mold closed; and FIG. 5 is a schematic view of an alternative turntable molding apparatus suitable for practicing the present invention.

DESCRIPTION OF THE PREFERRED EMBODIMENTS

Referring to FIG. 1, molding apparatus is shown suitable for covering a composite article and particularly an inflatable game ball with a covering of substantially uniform thickness. The apparatus is comprised of a mold 10 formed of top element 11 and bottom element 12, which have hemispherical mold cavity surfaces 13 and 14, respectively, as shown in FIG. 3. When closed as hereinafter described in connection with FIG. 4, the complementary mold elements 11 and 12 define a spherical mold cavity 15 corresponding to the outer surfaces of a desired game ball. The mold elements are typically cast of metal such as iron. Mold cavity surfaces 13 and 14 may contain relief such as ribs or pebble marks to correspond to the desired outer surface for the game ball, e.g. basketball, soccer ball, volleyball, football, etc.

The mold elements 11 and 12 are slidably mounted on support frame 16 to provide for vertical closing of the mold 10. Alternatively, one of the mold elements 11 and 12 may be fixed to support frame 16 and the other element slidably supported on frame 16 to provide for closing of mold 10. Mold elements 11 and 12 also have closed steam cavities 17 and 18 therein for heating the mold elements as hereinafter described. The steam is inlet to cavities 17 and 18 through inlets 19 and 20, respectively, and outlet from cavities 17 and 18 through outlets 21 and 22, respectively.

The molding apparatus also includes electrostatic spray unit 23 having spray nozzles 24 and 25 which are adapted to utilize fluids under pressure such as air to forcefully disperse and spray the molding material in finely divided form such as fine droplets of liquid or finely divided solid particulates in powder form. The spray nozzles are commercially available spray heads such as those made by Volstatic of Canada, Ltd., 1323 Matheson Blvd., Mississauga, Ontario, Canada. Spray unit 23 is slidably mounted on spray frame 26 horizontally from mold 10. Spray frame 26 is in turn rigidly positioned on base 27 which also supports frame 16.

The molding material is electrostatically sprayed on cavity surfaces 13 and 14 of the mold cavity 15 by inserting electrostatic spray unit 23 between mold elements 11 and 12. As shown in FIG. 3, spray nozzles 24 and 25 are preferably positioned at the centers of the hemispheres of surfaces 13 and 14. A substantially uniform electrostatic potential is then established between spray nozzles 24 and 25 and cavity surfaces 13 and 14 of mold elements 11 and 12, respectively. And the electrostatic spraying is commenced, preferably with the molding material in powdered form.

Electrostatic spraying is continued typically for about 1/2-4 minutes to form layer 28 of substantially uniform thickness over cavity surfaces 13 and 14. Typically layer 28 is between 0.040 and 0.100 inch (1.02 mm and 2.54 mm) in thickness. Molding material will no doubt also be deposited on mating surfaces 29 and 30 of mold elements 11 and 12, respectively. However, this molding material can be readily removed as flashing from the finished article after molding.

Preferably, before electrostatic spraying, mold 10 is heated by passing steam through cavities 17 and 18 of mold elements 11 and 12, respectively. The mold elements are preferably heated to a temperature greater than about 135°C. and most typically between 150° and 190°C. The optimum heating temperature will, of course, depend on the molding material used. By this arrangement, the molding material can be fused during electrostatic spraying to provide a more uniform layer 28 and the rate and uniformity of buildup can be more better controlled. Additionally, a thicker layer 28 can be formed because the insulating effects of the air spaces between the particulate particles is reduced, and the electrostatic charge between spray nozzles 24 and 25 and mold elements 11 and 12, respectively, can be maintained for a longer length of time.

Suitable molding materials are powders, as well as plastisols, of thermoplastic resins such as polyvinylchloride, polyethylene, polypropylene, polyacetate and polystyrene. Typically, the molding powders utilized for covering game balls is polyvinylchloride (PVC). Alternatively, other molding materials contemplated for use for various inflatable composite articles are thermosetting resins such as epoxides, polyesters, phenolics, unreaformaldehyde polyamides and polyimides. Even certain powder glasses and other ceramics as well as certain powdered metals and carbon may be suitable in certain applications other than inflatable game balls where rigid coverings are desired. In this connection, it should be noted that the liquid state may be produced with a carrier fluid such as steam or solvent, or by heating the molding material to a molten or semi-molten state before spraying.

After spraying of layer 28, electrostatic spray unit 23 is retracted as shown in FIG. 4, and inflatable center 31 is inserted into mold cavity 15. Inflatable center 31 is preferably a vulcanized rubber bladder 32 wound with nylon twisted yarn or other textile fiber 33 to provide shape retension of the finished composite article when pressurized such as a basketball, for example. Center 31 has bladder stem 34 extending from an opening therein through half-round openings 35 and 36 in mold elements 11 and 12 and bifurcated guide member 37 fixed to mold element 12.

The mold is then closed as shown in FIG. 4; and inflatable center 31 is inflated by attaching a suitable pressurized source of air (not shown) to bladder stem 34. Center 31 is inflated preferably to a pressure greater than about 600 kilopascals and most desirably between 1100 and 1250 kilopascals. Because of the construction weight of the typical center, e.g. 2.5 newtons, 1400 kilopascals is a practical upper limit for the inflation pressure. In any case, the inflated center 31 uniformly compresses the molding material against cavity surfaces 13 and 14 of mold elements 11 and 12 to produce mold details by the relief in the cavities surfaces. Layer 28 of the molding material by this arrangement extends over the outer surface of center 31 in a substantially uniform thickness.

Mold 10 is then heated by passing steam through cavities 17 and 18 of mold elements 11 and 12, respectively. The mold is preferably heated to a temperature greater than about 135°C. and most desirably between 150° and 190°C. The optimum heating temperature will, however, depend on the specific molding material utilized. The molding material of layer 28 is thus fused (or cured) into the desired covering for the inflatable composite element. Typically, for polyvinylchloride molding powder, the heating is continued for at least about 2 to 4 minutes.

Thereafter mold 10 is cooled by simply setting in air, or more preferably by quenching the mold with water. Typically a water quench is performed over at least about 5 to 7 minutes. Thereafter, the mold is opened by sliding mold elements 11 and 12 vertically along frame 16, and removing the finished inflatable composite article from the mold.

Referring to FIG. 5, an alternative turntable molding apparatus 40 is utilized for commercial performance of the inventive method. Turntable apparatus 40 has 12 stations 41 through 52 equally spaced around its periphery with a mold 10' identical to the mold above described at each station. The turntable rotates about shaft 53 by indexing from station-to-station in one minute intervals, so that an entire rotation is completed in 12 minutes.

The operation of the apparatus relates to the various stations about the periphery of the turntable. An electrostatic spray unit similar to that described above is positioned adjacent the turntable at station 41. As each mold is indexed to that station, the spray nozzles are positioned as above described and the layer of molding material is electrostatically sprayed over the cavity surfaces of the mold. The mold may be preheated at this and the previous station 52 to provide for fusing of the molding material sprayed on the cavity surfaces. Each mold is then indexed in turn to station 42 where the inflatable center is inserted, the mold closed and the center inflated.

During the indexing through stations 43 through 46, the mold is heated to fuse (or cure) the molding material and form the desired covering for the composite article. The heating thus comprises 25 to 30% of the molding cycle. During the indexing through stations 47 through 51, the mold is then cooled typically by a water quench or refrigeration. At station 52, the mold is opened and the composite article such as an inflatable game ball is removed. At this station also heating may again commence preparatory to electrostatic spraying for recycling to station 41.

While the preferred embodiments for practicing the invention have been described with particularity, it is distinctly understood that the invention may be otherwise embodied and performed within the scope of the following claims.

What is claimed is:

1. Apparatus for forming an inflatable composite article including an inflatable center covered with a molded material formed under heat and pressure, said center being adapted to retain said article in a predetermined shape after being formed, comprising:
    A. molding means including interconnected complementary metal elements movable between an open position and a closed position, said elements having surfaces which define, when said elements are in closed position, a molding cavity substantially corresponding to the desired shape and surface finish of said composite article, said metal elements including means to open and close said molding means;
    B. electrostatic pressure spraying means movably inserted into said molding means when said elements are in open position to respectively spray all said surfaces concurrently, while said elements remain in open position, for a selected time period with a finely divided molding material to form a substantially dried uniform layer of selected thickness of said molding material onto said surfaces, and to be movably retracted from said molding means before said elements are moved to a closed position;
    C. adjustable pressurizing means to inflate said center to a selected pressure, as said center is disposed within said molding cavity after said elements have been moved to a closed position, and thereby to compress said molding material into forceful contact with said center and with said surfaces to produce details in said molding material conforming to said surfaces;
    D. heating means to heat said molding means for a selected time and at a selected temperature while said center is maintained by said pressurizing means at said selected pressure until said molding material is finally formed into a finished covering to complete said composite article; and
    E. cooling means to cool said molding means before said elements are moved to open position for removal of said composite article from said molding means.

2. The apparatus of claim 1 wherein said layer of molding material formed on said surfaces is of thickness typically about 0.040 inch to 0.100 inch (1.02 mm and 2.54 mm.)

3. The apparatus of claim 1 wherein said selected pressure provided by said pressurizing means is greater than about 600 kilopascals and typically about 1100 to 1250 kilopascals with about 1400 kilopascals as the upper limit.

4. The apparatus of claim 1 wherein said selected temperature provided by said heating means until said molding material is finally formed is at least about 135°C. and typically about 150°C. to 190°C.

5. The apparatus of claim 1 wherein said electrostatic spraying means includes a respective spray nozzle to spray each of said surfaces.

6. The apparatus of claim 1 wherein said electrostatic spraying means is adapted to spray said molding material in the form of a finely divided particulate solid material.

7. The apparatus of claim 1 wherein said electrostatic spraying means is adapted to spray said molding material in the form of fine droplets of a liquid.

8. The apparatus of claim 1 wherein said heating means is further adapted to heat said elements in open position in combination with the spraying of said electrostatic spraying means.

9. The apparatus of claim 8 wherein said heating means is adapted to heat said elements in open position to a temperature of at least 135°C. and typically about 150°C. to 190°C.

10. The apparatus of claim 1 wherein: (a) said layer of molding material formed on said surfaces is of thickness typically about 0.040 inch to 0.100 inch (1.02 mm to 2.54 mm); (b) said selected pressure provided by said pressurizing means is greater than about 600 kilopascals and typically about 1100 to 1250 kilopascals with about 1400 kilopascals as the upper limit; (c) said selected temperature provided by said heating means until said molding material is finally formed is at least about 135°C. and typically about 150°C. to 190°C.; and (d) said electrostatic spraying means includes a respective spray nozzle to spray each of said 11. Apparatus for forming an inflatable composite game ball including an inflatable center covered with a molded material formed under heat and pressure, said center being adapted to retain said article in a predetermined shape when inflated after being formed, comprising:
  A. molding means including interconnected complementary metal elements movable between an open position and a closed position, said elements having surfaces which define, when said elements are in closed position, a molding cavity substantially corresponding to the desired shape and surface finish of said composite game ball, said metal elements including means to open and close said molding means;
  B. electrostatic pressure spraying means movably inserted into said molding means when said elements are in open position to respectively spray all said surfaces concurrently, while said elements remain in open position, for a selected time period with a finely divided molding material to form a substantially dried uniform layer of selected thickness of said molding material onto said surfaces, and to be movably retracted from said molding means before said elements are moved to a closed position;
  C. adjustable pressurizing means to inflate said center to a selected pressure, as said center is disposed within said molding cavity after said elements have been moved to a closed position, and thereby to compress said molding material into forceful contact with said center and with said surfaces to produce details in said molding material conforming to said surfaces;
  D. heating means to heat said molding means for a selected time and at a selected temperature while said center is maintained by said pressurizing means at said selected pressure until said molding material is finally formed into a finished covering to complete said composite game ball; and
  E. cooling means to cool said molding means before said elements are moved to open position for removal of said composite game ball from said molding means.

12. The apparatus of claim 11 wherein said layer of molding material formed on said surfaces is of thickness typically about 0.040 inch to 0.100 inch (1.02 mm and 2.54 mm).

13. The apparatus of claim 11 wherein said selected pressure provided by said pressurizing means is greater than about 600 kilopascals and typically about 1100 to 1250 kilopascals with about 1400 kilopascals as the upper limit.

14. The apparatus of claim 11 wherein said selected temperature provided by said heating means until said molding material is finally formed is at least about 135°C. and typically about 150°C. to 190°C.

15. The apparatus of claim 11 wherein said electrostatic spraying means includes a respective spray nozzle to spray each of said surfaces.

16. The apparatus of claim 11 wherein said electrostatic spraying means is adapted to spray said molding material in the form of a finely divided particulate solid material.

17. The apparatus of claim 11 wherein said electrostatic spraying means is adapted to spray said molding material in the form of fine droplets of a liquid.

18. The apparatus of claim 11 wherein said heating means is further adapted to heat said elements in open position in combination with the spraying of said electrostatic spraying means.

19. The apparatus of claim 11 wherein said heating means is adapted to heat said elements in open position to a temperature of at least 135°C. and typically about 150°C. to 190°C.

20. The apparatus of claim 11 wherein: (a) said electrostatic spraying means includes a respective spray nozzle to spray each of said surfaces; and (b) said electrostatic spraying means is adapted to spray said molding material in the form of a finely divided particulate solid material.

21. The apparatus of claim 11 wherein: (a) said electrostatic spraying means includes a respective spray nozzle to spray each of said surfaces; and (b) said electrostatic spraying means is adapted to spray said molding material in the form of fine droplets of a liquid.

22. Apparatus as set forth in claim 1 adapted to form a continuous series of composite articles as defined wherein: said electrostatic spraying means as defined is adapted to spray a successive series of molding means as defined; said adjustable pressurizing means is adapted to inflate a successive series of said centers as defined as said centers are disposed in said molding cavities of said series of molding means as defined; said heating means is adapted to heat each molding means of said successive series of molding means as defined; said cooling means is adapted to cool each molding means of said series of molding means as defined; and with each molding means of said series of said molding means being adapted to again be sprayed by said electrostatic spraying means after cooling by said cooling means and removal of said composite article from said molding means.

* * * * *